United States Patent Office 3,743,606
Patented July 3, 1973

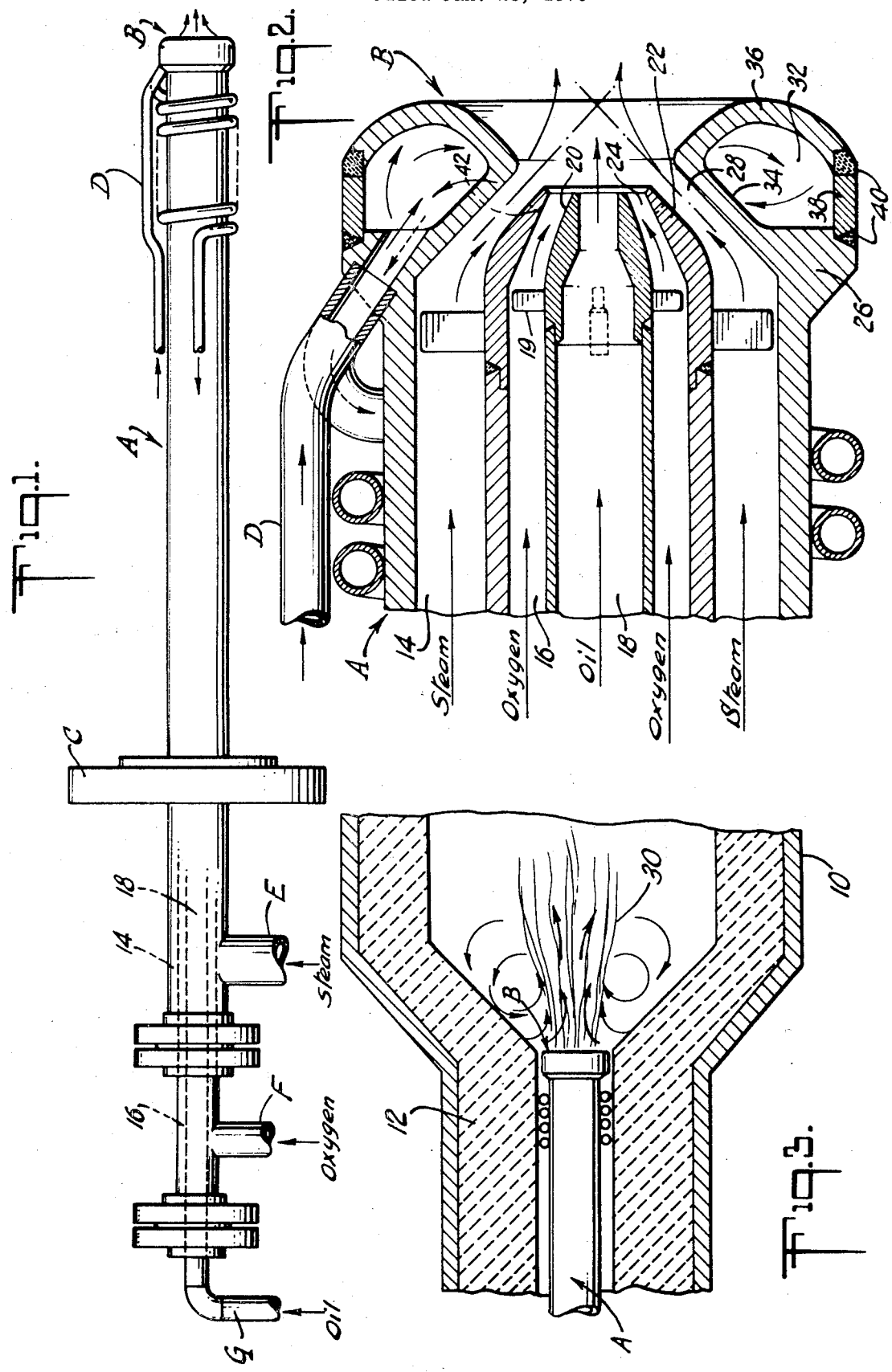

3,743,606
SYNTHESIS GAS GENERATION
Charles P. Marion, Mamaroneck, N.Y., and Blake Reynolds, Riverside, Conn., assignors to Texaco Development Corporation, New York, N.Y.
Continuation-in-part of application Ser. No. 787,885, Dec. 30, 1968. This application Jan. 23, 1970, Ser. No. 5,444
Int. Cl. C07c 1/02
U.S. Cl. 252—373     11 Claims

ABSTRACT OF THE DISCLOSURE

Manufacture of synthesis gas by partial oxidation of a normally liquid hydrocarbon by feeding into the reaction zone a relatively low velocity stream of liquid hydrocarbon and a stream of oxygen-containing gas thru separate central nozzles of a triple orifice burner in such a manner as to effect atomization of the oil downstream of the burner, these streams being enclosed in a third, outer annular stream of moderator gas, such as steam, so that none of the three streams comes into contact with any other gas with which it is combustible until it reaches a distance downstream from the burner tips beyond that close enough to cause appreciable deterioration.

---

This application is a continuation-in-part of application titled Synthesis Gas Generation, Ser. No. 787,885 filed Dec. 30, 1968.

BACKGROUND OF THE INVENTION

The present invention relates to the generation of synthesis gas comprising essentially a mixture of hydrogen and carbon monoxide. More particularly it involves the manufacture of this product by the partial combustion of a liquid hydrocarbon by molecular oxygen in the presence of a moderator, such as steam, at an elevated pressure and temperature.

As is known, hydrocarbons can be converted essentially quantitatively into carbon monoxide and hydrogen by controlled reaction with oxidizing agents of the class consisting of molecular oxygen, water vapor and $CO_2$. The reaction with oxygen is an exothermic one, while the two latter agents react endothermically. Therefore, to conduct a self-supporting reaction calls for the use of molecular oxygen.

Normally liquid hydrocarbons, particularly the heavier liquid hydrocarbons, because of the release of a relatively large heat of reaction when partially oxidized with molecular oxygen, require the introduction of substantial quantities of steam (or other moderator such as carbon dioxide) into the reaction without impairing the self-supporting character of the reaction or the desirable reaction temperature range. This introduction effects a number of important results including, for example, the moderation of what might be otherwise excessive reaction temperatures to a desirable range of, for example, 1,800 to 3,500° F. and a substantial proportionate increase in the production of hydrogen or carbon monoxide as the case may be.

The present invention is accordingly concerned with the manufacture of synthesis gas by the reaction of a normally liquid hydrocarbon, in the presence of a moderator, such as steam, with a stream containing molecular oxygen, this stream comprising preferably essentially pure oxygen or oxygen-enriched air, as for example, an air-oxygen mixture containing more than 21 percent of molecular oxygen, in the temperature range of from about 1,800 to 3,500° F. and at any reasonable pressure. It is advantageous to carry out the partial combustion at an elevated pressure above 200 pounds per square inch, as for example, in the range of 400 to 4,000 p.s.i. On the other hand, it will operate at low pressures such as one or two atmospheres.

The reaction preferably takes place within a refractory-lined vessel, under relatively turbulent conditions for a time period of from 0.5 to 8 seconds. For purposes of the present invention, neither the time nor pressure of reaction appear to be either critical or controlling.

The feed material must be introduced from a burner, which is necessarily subjected to intense heat and pressure. Furthermore, apart from the intense heat radiation to which the burner is subjected from the interior of the reactor, turbulent circulation of combustion gases sweeping the exposed nozzle surfaces subjects them to conditions of erosive and chemical attack; and even under the influence of internal cooling, the intense rate of heat flow results in deterioration of the burner and introduces hazards arising from mechanical failure.

In accordance with the present invention the reactants are introduced into the reaction chamber by means of a burner consisting of three convergent, concentric nozzles, so designed and operated as to obviate in large measure the detrimental effects previously referred to. The liquid hydrocarbon may be introduced through a central nozzle. The molecular oxygen stream separately flows from an intermediate annular nozzle surrounding the central nozzle, at a linear velocity substantially greater than that of the liquid hydrocarbon and converging at an acute conical angle to the axis of the fuel stream. As a result, the fuel is subjected to a shearing action by which it is first torn into ligaments and then atomized into fine droplets. The droplets form a mist downstream, finely dispersed in the oxygen stream, and of such minuteness as to provide an intimacy of contact favorable for subsequent partial oxidation. Likewise the two streams may be reversed, the oxygen entering via the central nozzle and the liquid hydrocarbon via the intermediate, annular nozzle, insofar as the parts are arranged to effect atomization a predetermined distance downstream of the tip.

A third or outer stream of moderator, e.g., steam or water vapor, passes thru an outer nozzle surrounding the intermediate nozzle and may flow at a linear velocity substantially less than that of the intermediate atomizing stream of molecular oxygen. As a result of the lower steam velocity, the turbulent flow of hot, recirculating gas across the surfaces of the outermost nozzle is less than would be induced by the high velocity intermediate stream; and the exposed nozzle portions thereof are relatively protected from chemical or physical deterioration.

In order to illustrate the invention in greater detail, reference is made to one exemplary embodiment involving a burner constructed as shown in figures of the drawing wherein:

FIG. 1 is a general elevation of the burner assembly shown diagrammatically in position within the reaction chamber.

FIG. 2 is a detailed cross-section diametrically across the burner tip.

FIG. 3 is a diagrammatic representation of a burner exemplifying in general the flow or reactants from the burner tip.

FIG. 3 shows the portions of the reaction chamber of the synthesis gas generator located about the burner as an outer shell 10 and inner refractory lining 12. A burner A with a tip or nozzle portion B passes thru an elongated passageway formed in the reaction vessel and refractory lining, so that its axial extremity or tip B faces the heated interior of the reaction chamber. A mounting flange C, illustrated, is provided to attach the burner to reaction vessel, and cooling tubes D can be used to conduct a continual flow of coolant thru the burner tip as will hereinafter more fully appear.

The remainder of the burner assembly, as shown in FIG. 1, comprises means for introducing the several reactants. Steam inlet E conducts a flow of moderator to an outer annular channel 14. Oxygen, containing gas is introduced at side inlet F as a feed to an intermediate annular channel 16, whereas the liquid hydrocarbon supply is introduced at inlet G into central conduit 18.

Referring now to FIG. 2, the central feed nozzle 20 is welded to the extremity of conduit 18 as shown and is provided with fins 19 located at several longitudinal positions to align and space it from the intermediate tip 22 which, together with the outer surface of the nozzle 20, defines the intermediate annular nozzle or channel 24. This is fed via conduit 16 with oxygen-containing stream and is designed to accelerate to a high velocity.

An outer tip or nozzle portion 26, which forms a continuation of the steam conduit 14, provides an outer, annular nozzle 28 for injecting an annular sheath of the moderator, such as steam or water vapor.

It will be observed that by the above means the reactant streams are maintained separate from one another, and none can intermingle with any other until it leaves its respective tip and is injected into the reaction chamber to intermingle with the adjacent streams at a small, though finite distance from the extremity of the burner tip. Accordingly, neither the oil nor oxygen nor steam conduit nor the extremities thereof are directly contacted by burning mixture. This result follows also from the fact that the oxygen and oil streams, and particularly the oxygen stream, are blanketed by the outer annular sheath of moderator, such as steam or water vapor; and thereby the oxygen is prevented from contacting and burning with recirculating synthesis gas until a substantial distance downstream from the burner tips.

Moreover by virtue of a relatively reduced linear velocity of steam flow, detrimental turbulence across the face of the burner tip may be reduced. This is illustrated more or less diagrammatically in FIG. 3 which shows how turbulent eddies or currents are set up by the kinetic energy of the high velocity injection of the reactant streams into the reaction chamber. As indicated, the kinetic energy of a high-velocity stream as at 30, sets up swirls which sweep the exposed surfaces of the burner tip with chemically active, high-velocity flow of hot gases which can lead to excessively high metal surface temperatures. Clearly, this invention affords a technique whereby the turbulence or eddying can be controlled and minimized by reducing the relative linear velocity of the injected steam.

Thus by decreasing the linear velocity of the outer annular flow of steam with respect to the flow of oxygen, the peripheral energy can be decreased and the turbulence or recirculation accordingly reduced. Accordingly, where high momentum of flow causes objectionable corrosive and/or erosive effects of the gases on the burner tip, a decrease in the velocity of steam flow, to, for example, a velocity which is substantially less than that of the oxygen stream, correspondingly lessens the violence of the eddy induced by the burner. Since heat flow varies with gas velocity, rate of heat transfer from the reaction zone to the burner tip is also diminished, along with the corrosive or erosive effects from the recirculating hot gases.

Yet further it is to be observed that the annular sheath of moderator provides the surrounding volume, in the vicinity of the outer tip of the burner, with an endothermic reactant, for example, water vapor, which, in its reaction with synthesis gas is essentially a heat-absorbent, as distinguished from a heat-liberating reactant such as oxygen.

The outer portions of the burner tip can be provided with a coolant chamber 32, which preferably is relatively thin-walled. Thus the internal annular chamber 32 is defined by an inner wall 34 disposed concentrically about the axis of the burner and forming the outer boundary of the annular moderator nozzle. A convex end or face 36 forms the jacket wall. To facilitate construction, the cooling chamber 32 is closed on its outer circumferential side by annular wall member 38 welded at 40.

The cooling tubes D, previously mentioned, connect to the coolant chamber 32 in any convenient way to direct, continuously a stream of coolant therethrough. Moreover it is to be noted that, since the face wall 36 is convex, its thin section is better able to withstand the elevated pressures within the reaction chamber than would be a flat wall.

From the foregoing it will be apparent that the term "moderator," as used herein, consists of steam or water vapor as exemplified above, or any gaseous material which is either inert or substantially inert with respect to the other constituents of either the feed or the reaction zone. By "substantially inert" it is meant to include constituents which react endothermically in forming the final product or with such a small degree of exothermicity as to be negligible. Specifically, therefore, the term "moderator" as used herein is restricted to steam or water vapor, carbon dioxide, inert gases (such as nitrogen) or mixtures of the foregoing, such as flue gas for example. It is to be particularly understood that the inerts, while broadly usable, have, of course, the obvious disadvantage of diluting the reaction product. Therefore, where dilution is objectionable and where the diluent is not easily separable they may introduce their own limitations to the extent therefore that carbon dioxide and water in the form of steam or other vapor are to be preferred.

By way of example, the following flow velocities represent typically illustrative flow conditions prevailing at the nozzle in the system described above:

|  | Preferred range velocity, ft./sec. | Broad range of velocity, ft./sec. |
| --- | --- | --- |
| Hydrocarbon | 10–50 | 10–100. |
| Oxygen-containing gas. | 200–600 | At least 100 ft./sec. greater than the velocity of liquid hydrocarbon stream. |
| Moderator | 100–300 | Greater than the linear velocity of liquid hydrocarbon stream. |

These velocities can be varied according to the size, pressure and other operating requirements of the system, but the relative velocity of the atomizing stream, namely the oxygen-containing gas, is necessarily kept substantially greater than that of the oil stream so as to enable the oxygen to effect the necessary atomization of the oil and the admixture with oxygen to form a burning mist. While this can be done with a relative oxygen velocity as low as 10 to 50 feet per second, it is preferable to effect atomization at a velocity at least 100 feet per second (and preferably more than 100–300 feet per second) greater than that at which the oil is ejected from its nozzle, for example, in the range of 250–600 feet per second or over. The upper limit of oxygen flow velocity is that at which atomization and admixture are completely effective and at which further increase in velocity offers no advantage while unnecessarily increasing pressure drop. Nevertheless, within this range the higher oxygen velocities and the resulting small size of oil drops and intimacy of admixture with oxygen ultimately lead to maximum reaction efficiency as evidenced, for example, by low soot formation.

Moreover, the moderator velocity, as above explained, may be materially or substantially less than that of the oxygen, for example, one-half of the velocity of the oxygen stream. However, it has been found best to express this (as is done in the case of the oxygen stream) as a function of the hydrocarbon stream, namely as having a linear velocity greater than that of the hydrocarbon stream.

And also as intimated above, where the problem of high injection momentum and eddying in the reaction zone are not a problem there is no upper limit of moderator velocity.

As shown above, in the type of burner disclosed, the central nozzle has been found to be relatively immune from attack in service because it is physically spaced from any combustible mixture and further because the liquid oil, although it may be, and desirably is pre-heated, nevertheless acts as an efficient protective coolant for the metal tip. The oil cannot be burned until it is atomized and possibly vaporized, a finite distance downstream from the burner tip. This follows from the fact that oxygen or oxygen-containing gas cannot burn immediately with unvaporized and unatomized oil.

The inner annular tip is also relatively immune from attack since it is not in contact with a combustible mixture. Steam cannot burn with oxygen. This tip, therefore, is not attacked unless overheated, from which it is protected by a limited exposure as well as by the coolant effects of the oxygen and steam flows upon its inner and outer surfaces respectively.

The outer annular tip or nozzle is also relatively immune from attack because it likewise is not in contact with a combustible mixture. This tip is contacted only by a stream of steam and by the surrounding eddy of circulating synthesis gas within the combustion chamber as described above. Steam cannot burn with synthesis gas (in an appreciably exothermic reaction), although it can react by the water-gas shift in a very mildly exothermic reaction.

As above indicated, the rate of heat transfer from the reaction chamber to the outer tip or face of the outer annular nozzle is controllable by selecting a moderator velocity low enough so that the kinetic energy imparted to the re-circulation of the hot synthesis gas across the jacket face is substantially restricted. This method, accordingly, limits the heat flux, as well as the thermal and mechanical stresses, and physical and chemical corrosion and/or erosion of the outer jacket wall. Moreover stresses can be limited by using a wall of convex shape in a relatively thin section.

It is to be understood that part of the moderator may be intermixed with the oxygen stream in the intermediate annular nozzle, preferably in an amount less than about 25 weight percent of the oxygen.

The intermediate annular tip 22 may be axially cut back a short distance, as indicated by the dotted line 42 in FIG. 2, which would allow a limited amount of intermixing of the steam and oxygen streams before they issue into the reactor, provided, however, that the protecting sheath of steam is not thereby excessively accelerated or thinned to the point that the oxygen can diffuse thru the blanket of steam and burn with synthesis gas too close to the burner tip or, in conjunction with other reactants, attack the outer surface of the metal tip.

As also previously intimated, each of the three streams of reactants, being separately supplied, may be independently preheated to the desired degree.

Specific example

The following is an example of a commercial design process using a 5" triple-orifice tip-atomizing burner.

Liquid oil, specifically a petroleum fraction with gravity of 5° API, enters at the rate of 55,000 pounds per hour and a temperature of 300° F thru the central orifice of the burner disclosed in the drawings.

The innermost orifice has a diameter of 1.215", and the velocity of the liquid at the tip is 30 feet per second.

The oxygen enters thru the immediate annular orifice, as shown in the drawings, converging at a conical angle of approximately 25° to the axis of the central orifice.

The oxygen feed amounts to 683 short tons per day at a temperature of 300° F.

The inside diameter of the intermediate annular orifice for the oxygen is 1.250 inches and the outer diameter is 1.719 inches, all diameters measured in a plane normal to the axis of the central nozzle. Therefore, the stream of oxygen issuing from the intermediate annular orifice flows at the velocity rate of 415 feet per second.

The outer annular orifice conducts a moderator comprising 27,700 pounds per hour of steam at a temperature of 750° F. The inside diameter of the outer orifice is 1.827 inches, measured as above; and the outer diameter is 2.750 inches. Therefore, the nozzle velocity of the steam is 151 feet per second.

The outer annular nozzle converges at a conical angle of 30 degrees with respect to the axis of the central nozzle, so that the outer wall is substantially parallel to that of the inner wall.

The width of the outer or annular orifice is 0.53 inches, while the width of the inner annular orifice is 0.27 inches or approximately one-half of the former width. This, therefore, in practice, permits some greater variation between the relative velocities of the steam and oxygen than would be the case of an outer moderator sheath which might be of substantially decreased thickness and therefore susceptible to disruption.

The burner injects the reactants streams directly into a combustion chamber which operates at a pressure of 1,200 p.s.i.g. and a temperature of approximately 2500° F. Inasmuch as the diameter of the outermost burner pipe is approximately 5 inches, there is considerable of the burner extremity projecting radially outward beyond the periphery of the outer annular orifice and exposed to the interior of the reaction zone. In spite of this, the burner operates in the process over extended, indefinite periods of time without damage to the exposed surfaces of the burner.

The tip atomizing type of equipment to which the present invention pertains, as previously indicated, normally involves impingement of one reactant stream, such as oxygen, upon another, such as a liquid hydrocarbon, to disrupt, tear and, in effect, to shred the liquid into a finely atomized intermixture.

The details of this principle form obviously no part of the present invention because they involve a matter of design based upon knowledge and teachings available in the prior art. In a general way, for example, the mixing effect is based upon such variables as the relative difference in velocity between two streams, where the oxygen stream has a linear velocity greater than the central stream of liquid oil. It also depends on the angle of impingement of the two streams as, for example, where the oxygen stream is inclined toward and gradually impinges on the central stream of oil. Obviously these factors depend in turn on other considerations known to any design engineer.

In the present embodiment therefore, the angle between the axis of the burner and the annular oxygen orifice may, for example, vary widely.

It is clear that a great angle may bring the point of combustion to quite close to the burner tip, whereas a somewhat more remote point might be more conducive to burner durability.

In the preferred embodiment of the present invention the angles of the orifices to the axis of the burner are as follows, the central nozzle preferably being coaxial with the axis of the burner and the two annular nozzles being arranged to eject concial streams, the conical surfaces of which make an angle with the axis of the burner, with the following ranges:

|  | Preferred angel, degrees | Broad angle, degrees |
| --- | --- | --- |
| Inner annular nozzle | 20–35 | 10–55 |
| Outer annular nozzle | 25–45 | 15–60 |

Likewise, mention is made of the desirability of avoiding any break or interruption in the annular sheath of moderator issuing from the outer annular orifice, such as would be caused by irregularities, separators, projections, etc. in the burner orifice and to assure a uniform, uninterrupted sheath of projective gas.

Moreover, again to emphasize an obvious matter of design, where a relatively thick sheath of moderator issues from the outer orifice, the relative velocity difference between the intermediate and outer orifice streams may obviously be greater. Thus, for example, if a relatively thin sheath of moderator is substituted in the foregoing example, a correspondingly greater linear velocity of moderator stream would be desirable in order to protect and sheath the oxygen stream between the orifice tip and the point of reaction. Thus, if instead of a moderator stream having a width of 0.53 inch, as shown in the specific example, the moderator sheath has a radical thickness of, for example, 0.25 inch or less, its velocity would preferably be in the range of 200 feet per second.

Referring now to the proportions of reactants and their distribution in the various streams, reference is specifically made to the extensive prior art literature, and particularly to various papers published in behalf of the assignee of record (copies of which are attached) as follows:

The Production of Synthesis Gas by Partial Oxidation by deBois Eastman—The Texas Co., Montebello, Calif.—1959, Fifth World Petroleum Congress. Section IV—Paper 13.

Synthesis Gas by Partial Oxidation by duBois, Eastman, The Texas Co., Montebollo, Calif., reprinted from Industrial & Engineering Chemistry, Vol. 48, page 1118, July 1956.

The Chemistry of Synthesis Gas Generation by Partial Combustion at Various Pressures by William L. Slater and Roger M. Dille, Texaco Inc., U.S.A., International Congress on Industrial Chemistry, Brussels, Sept. 20–21, 1966.

Generation of Synthesis Gas by Partial Oxidation by W. G. Schlinger—paper for presentation at the California Industrial Associates Conference, April 25 and 26, 1967.

Manufacture of Tonnage Hydrogen by Partial Combustion—The Texaco Process—by C. P. Marion and W. L. Slater, Section III, Paper 22, PD 9.

Partial Combustion of Residual Fuels by W. L. Slater and R. M. Dille, Texaco Inc., Montebello, Calif. Reprinted from Chemical Engineering Progress, November 1965.

Moreover, these and all of the other publications and patents pertaining to the prior art of this process are referred to and made part of the record herein insofar as the Patent Office may, in future, require their incorporation in the present application.

As previously stated, the present invention is concerned with the partial combustion of normally liquid hydrocarbons. This, therefore, specifically means those which are liquid at ambient conditions and temperatures therebelow. This includes, for example, butanes, pentanes, hexanes and on up thru the entire range, including natural gasolines, kerosenes, gas oils, naphthas, diesel fuels, crude oils, residua, whether atmospheric or vacuum, coal tars, tar sand oils, shale oils, as well as hydrocarbons which may contain other atoms, such as oxygen, however, in such proportions as not to interfere with self-sustaining combustion.

Specifically it may also be stated that the invention includes all hydrocarbons having a gravity in the range of from minus 15° API to 150° API.

The proportioning of the reactants, as is obvious from the references, calls for limitation of the oxidizing agents sufficient to effect only "partial oxidation" which the prior art knows and understands to mean the production of gaseous carbon monoxide and hydrogen to the essential exclusion of the complete oxidation products, namely $H_2O$ and $CO_2$.

The selection, therefore, is a matter of design, obvious to the skilled engineer, in view of the present invention and of the prior art, realizing, for example, that the high gravity hydrocarbons tend to release greater amounts of exothermic energy and thus permit, as well as call for, greater proportions of the moderating oxidants, such as $CO_2$ and $H_2O$, and thus to increase the relative production of the desired products and alleviate and moderate otherwise excessixe temperatures within the reaction zone. Where, in a typical example, temperatures tend to run over 2400–2500 F. the designer may ordinarily wish to substitute moderator in the form of $CO_2$ or $H_2O$ for pure oxygen as is fully known in the art.

Conversely, it is the same moderator requirement in the case of liquid hydrocarbons which enables the introduction of an outer protective sheath of moderator in accordance with the present invention; which would not otherwise be feasible in the case of those gaseous hydrocarbons wherein the available exothermal heat in the presence of oxygen may be insufficient to permit substantial use of moderators.

With respect to the question of the dimensions of the orifice openings, these obviously follow from the throughput of ingredients of feed materials and the selected nozzle velocities as determined by the designer.

Referring to the feature of intermixing a portion of the added steam with the stream of oxygen, this is usually preferred by the designer, where there is a special tendency for an over-intensified localized combustion to occur close to the tip of the nozzle, such as may occur where a quite volatile liquid hydrocarbon is employed and which tends to vaporize and, therefore, to mix and react rapidly with pure oxygen. This, in the case of preheated, volatile hydrocarbons which tend to liberate intensive heat close to the nozzle may be overcome to a large extent by alloting a portion of moderator to the oxygen stream in order to slow down the reaction between the oxygen and liquid hydrocarbon.

Conversely, with liquid oil which must be either extensively vaporized or atomized before it can be involved in any extensive combustion, the introduction of steam within the oxygen stream may be unnecessary.

In general, however, steam dilution of more than *25 weight percent of the stream of oxygen* is not usually necessary or advisable for the purpose of adequately modifying the activity of the oxygen stream.

Therefore, while it may be preferable in the case of ordinary heavy liquid hydrocarbon to include 100% of the added steam in the sheath, a proportion of this, determined by the design factors, may be transferable to the oxygen stream.

We claim:

1. In the manufacture of synthesis gas by reacting a stream comprising molecular oxygen and a stream of steam with a stream of normally liquid hydrocarbon fuel in a reaction zone at a pressure in the range of about 1 to 275 atmospheres and a temperature in the range of about 1800 to 3500° F. and in proportions effective to produce a product consisting essentially of hydrogen and carbon monoxide by the partial combustion process, the improvement which comprises simultaneously injecting said reactants into the reaction zone from a burner having three coaxial, separate concentric passages comprising a central coaxial cylindrical passage, a single intermediate converging annular discharge passage coaxial with the central passage, and a third or outer discharge passage comprising a converging annular passage surrounding and coaxial with the first named passages and developing into an outwardly diverging tapered unobstructed central passageway near the downstream tip of the burner, said molecular oxygen stream and said liquid hydrocarbon stream being separately injected from said central passage and said intermediate passage respectively, at sharply disparate linear velocities and at an acute angle relative to each other to effect atomization of the liquid hydrocarbon and intimate association of the reactants at a finite distance downstream from the extremity of the burner tip so that burning can take place without damaging the orifices at the downstream ends of said passages, and injecting the stream of steam through the outer discharge passage at a velocity sufficiently low so as to lessen the effect of the kinetic energy of the injected streams in promoting turbulence of the surrounding hot product synthesis gas within said reaction zone, but at a relative velocity greater than that of the liquid hydrocarbon stream so as to coact with the molecular oxygen stream in atomizing efficiently the annular stream of liquid hydrocarbon flowing between the oxygen and steam streams.

2. In the manufacture of synthesis gas by the partial oxidation of a reactant stream comprising normally liquid hydrocarbon in liquid phase with a reactant stream comprising free oxygen-containing gas in the presence of a temperature-moderating gas in a reaction zone at an autogeous temperature in the range of about 1800 to 2500° F. and in proportions effective to produce a gas mixture substantially comprising hydrogen and carbon monoxide, the improvement which comprises introducing said materials into said reaction zone by passing one of said reactant streams through a central axial tubular conduit provided with a central axial nozzle having an unobstructed circular discharge orifice at the downstream tip of said nozzle; simultaneously passing the other reactant stream through an intermediate coaxial concentric conduit disposed about said central tubular conduit and provided with an intermediate coaxial concentric converging discharge nozzle on the downstream end, thereby providing a single unobstructed converging intermediate annular passage between said central nozzle and said intermediate nozzle for directing the second reactant into the reaction zone as a converging stream having a conical surface, and wherein the relative velocity difference between said first and second reactant streams is such as to accomplish the atomization of the stream of liquid hydrocarbon and the forming of a mist of finely dispersed hydrocarbon in free oxygen-containing gas at a sufficient distance downstream from the downstream tips of said nozzles so that the burning of said mist can occur without causing appreciable damage to the nozzle tips; and simultaneously passing a stream of temperature-moderating gas through an outer coaxial concentric conduit disposed about said intermediate coaxial concentric conduit and provided with a coaxial concentric converging outer discharge nozzle that flares out near the downstream tip of the burner for directing said temperature-moderating gas into the reaction zone as an annular sheath of gas of substantially uniform density and velocity, said sheath extending a finite distance downstream of the downstream end of said burner and enveloping said first and second reactant streams and separating them from any other gas in the surrounding area with which they may be combustible until said reactant streams reach a sufficient distance downstream from the end of the burner so that burning may take place without causing appreciable damage to the nozzle tips.

3. The process of claim 2 wherein said stream of liquid hydrocarbon is passed through said central axial tubular conduit in liquid phase, said stream of free oxygen-containing gas is passed through said converging intermediate annular passage and said temperature-moderating gas is passed through said outer discharge nozzle at an exit velocity which is substantially greater than the exit velocity of said stream of liquid hydrocarbon but substantially less than the exit velocity of said stream of free oxygen-containing gas and wherein the exit velocity of said temperature-moderating gas is low enough so that the kinetic energy imparted to the recirculating hot synthesis gas near the downstream end of the burner is substantially restricted.

4. The process of claim 2 wherein said liquid hydrocarbon is passed through said central axial tubular conduit in liquid phase at a velocity in the range of about 10 to 100 feet per second, said free oxygen-containing gas is passed through said converging intermediate annular passage at an exit velocity in the range of about 110 to 600 feet per second, and said temperature-moderating gas is passed through said outer discharge nozzle at an exit velocity in the range of about 55 to 300 feet per second, and wherein the relative velocity between the liquid hydrocarbon stream and the free oxygen-containing gas stream is maintained at a value of not less than about 100 feet per second.

5. The process of claim 2 wherein said stream of free oxygen-containing gas is passed through said central axial tubular conduit at an exit velocity in the range of about 110 to 600 feet per second, said stream of liquid hydrocarbon in liquid phase is passed through said converging intermediate annular passage at an exit velocity in the range of about 10 to 100 feet per second, and said stream of temperature-moderating gas is passed through said outer discharge nozzle at an exit velocity in the range of about 110 to 600 feet per second, and wherein the relative velocity between the liquid hydrocarbon stream and the free oxygen-containing gas stream is maintained at a value of not less than about 100 feet per second.

6. The process of claim 2 wherein said normally liquid hydrocarbon is selected from the group consisting of butane, pentane, hexane, gasoline, kerosene, gas oil, naphtha, diesel fuel, crude oil, residual oil, coal tar, tar-sand oil, shale oil, oxygen-containing hydrocarbons, and mixtures thereof.

7. The process of claim 2 wherein said oxygen-containing gas is selected from the group consisting of substantially pure oxygen containing 90–100 volume percent $O_2$, air, and oxygen-enriched air containing more than 21 volume percent $O_2$.

8. The process of claim 2 wherein said temperature-moderating gas is selected from the group consisting of steam, water vapor, carbon dioxide, flue gas, inert gas, such as nitrogen, and mixtures thereof.

9. The process of claim 2 wherein part of the moderator is admixed with said oxygen-containing gas in proportion less than about 25 weight percent of the oxygen therein.

10. The process of claim 2 wherein the reactant stream passing through said converging intermediate annular passage is delivered as a conical stream which makes an angle in the range of about 10 to 55 degrees with the axis of the burner, and said temperature-moderating stream passing through said converging outer discharge nozzle is delivered as a conical stream which makes an angle in the range of about 15 to 60 degrees with the axis of the burner.

11. The process of claim 2 wherein said stream of liquid hydrocarbon is passed through said central axial nozzle, said stream of free oxygen-containing gas is passed through said intermediate coaxial nozzle whose tip is recessed upstream from the tip of said central axial nozzle, said stream of temperature-moderating gas is passed through said outer coaxial nozzle and a limited amount of intermixing of said streams of free oxygen-containing gas and temperature-moderating gas is effected before they issue into the reaction zone.

References Cited
UNITED STATES PATENTS

| | | | |
|---|---|---|---|
| 3,048,476 | 8/1962 | Dwyer | 252—373 |
| 2,776,195 | 1/1957 | Wessolek | 48—215 |

LEON ZITVER, Primary Examiner

A. SIEGEL, Assistant Examiner

U.S. Cl. X.R.

48—95, 215; 23—281